(12) United States Patent
Wallace

(10) Patent No.: US 7,404,483 B2
(45) Date of Patent: Jul. 29, 2008

(54) ADHESIVE SYSTEM AND METHOD OF MAKING SAME

(75) Inventor: Richard B. Wallace, Bingham Farms, MI (US)

(73) Assignee: ND Industries, Inc., Clawson, MI (US)

( * ) Notice: Subject to any disclaimer, the term of this patent is extended or adjusted under 35 U.S.C. 154(b) by 457 days.

(21) Appl. No.: 11/284,291

(22) Filed: Nov. 21, 2005

(65) Prior Publication Data

US 2007/0114145 A1 May 24, 2007

(51) Int. Cl.
*B65D 25/08* (2006.01)
*B65B 55/14* (2006.01)

(52) U.S. Cl. .............................. 206/219; 53/440; 141/9

(58) Field of Classification Search ......... 206/219–222, 206/447, 568; 53/428, 431, 440; 141/2, 141/9, 10, 100
See application file for complete search history.

(56) References Cited

U.S. PATENT DOCUMENTS

| | | | |
|---|---|---|---|
| 3,950,579 A | 4/1976 | Wallace | |
| 4,059,136 A | 11/1977 | Wallace | |
| 4,081,012 A | 3/1978 | Wallace | |
| 4,262,038 A | 4/1981 | Wallace | |
| 4,268,544 A | 5/1981 | Wallace | |
| 4,279,943 A | 7/1981 | Wallace | |
| 4,285,378 A | 8/1981 | Wallace | |
| 4,321,885 A | 3/1982 | Wallace | |
| 4,325,985 A | 4/1982 | Wallace | |
| 4,399,166 A | 8/1983 | Wallace | |
| 4,420,604 A | 12/1983 | Wallace | |
| 4,428,981 A | 1/1984 | Wallace | |
| 4,428,982 A | 1/1984 | Wallace | |
| 4,501,041 A | 2/1985 | Wallace | |
| 4,508,759 A | 4/1985 | Wallace | |
| 4,545,712 A | 10/1985 | Wallace | |
| 4,686,272 A | 8/1987 | Wallace | |
| 4,764,579 A | 8/1988 | Wallace | |
| 4,847,113 A | 7/1989 | Wallace | |
| 4,851,175 A | 7/1989 | Wallace | |
| 4,891,244 A | 1/1990 | Wallace | |
| 4,927,012 A * | 5/1990 | Rowe | 206/219 |
| 5,000,636 A | 3/1991 | Wallace | |
| 5,202,365 A | 4/1993 | Wallace | |
| RE34,522 E | 1/1994 | Wallace | |
| 5,316,400 A * | 5/1994 | Hoyt et al. | 206/469 |
| 5,353,927 A * | 10/1994 | Stupar et al. | 206/219 |
| 5,426,130 A | 6/1995 | Thurber et al. | |
| 5,518,768 A | 5/1996 | Wallace et al. | |
| 5,556,601 A * | 9/1996 | Huvey et al. | 156/172 |
| 5,607,720 A | 3/1997 | Wallace et al. | |
| 5,651,824 A | 7/1997 | Wallace et al. | |
| 5,656,325 A | 8/1997 | Wallace | |
| 5,672,376 A | 9/1997 | Wallace | |
| 5,679,160 A | 10/1997 | Wallace et al. | |
| 5,918,727 A | 7/1999 | Wallace et al. | |
| 5,928,711 A | 7/1999 | Wallace et al. | |

(Continued)

*Primary Examiner*—Luan K Bui
(74) *Attorney, Agent, or Firm*—Bliss McGlynn, P.C.

(57) ABSTRACT

An adhesive system and method of making same includes a package that defines a chamber, a resin component disposed within the chamber, and a hardener component disposed within the chamber. At least one of the resin component and the hardener component includes a photo-curable ingredient and is through cured to thereby prevent chemical reaction between the resin component and the hardener component within the package.

20 Claims, 1 Drawing Sheet

U.S. PATENT DOCUMENTS

| | | |
|---|---|---|
| 5,964,551 A | 10/1999 | Wallace |
| 6,027,568 A | 2/2000 | Wallace et al. |
| 6,063,437 A | 5/2000 | Wallace et al. |
| 6,228,169 B1 | 5/2001 | Wallace |
| 6,270,838 B1 | 8/2001 | Wallace et al. |
| 6,322,628 B1 | 11/2001 | Wallace |
| 6,474,919 B2 | 11/2002 | Wallace et al. |
| 6,520,335 B2 * | 2/2003 | Moran et al. ............... 206/568 |
| 6,817,816 B2 | 11/2004 | Hill |

* cited by examiner

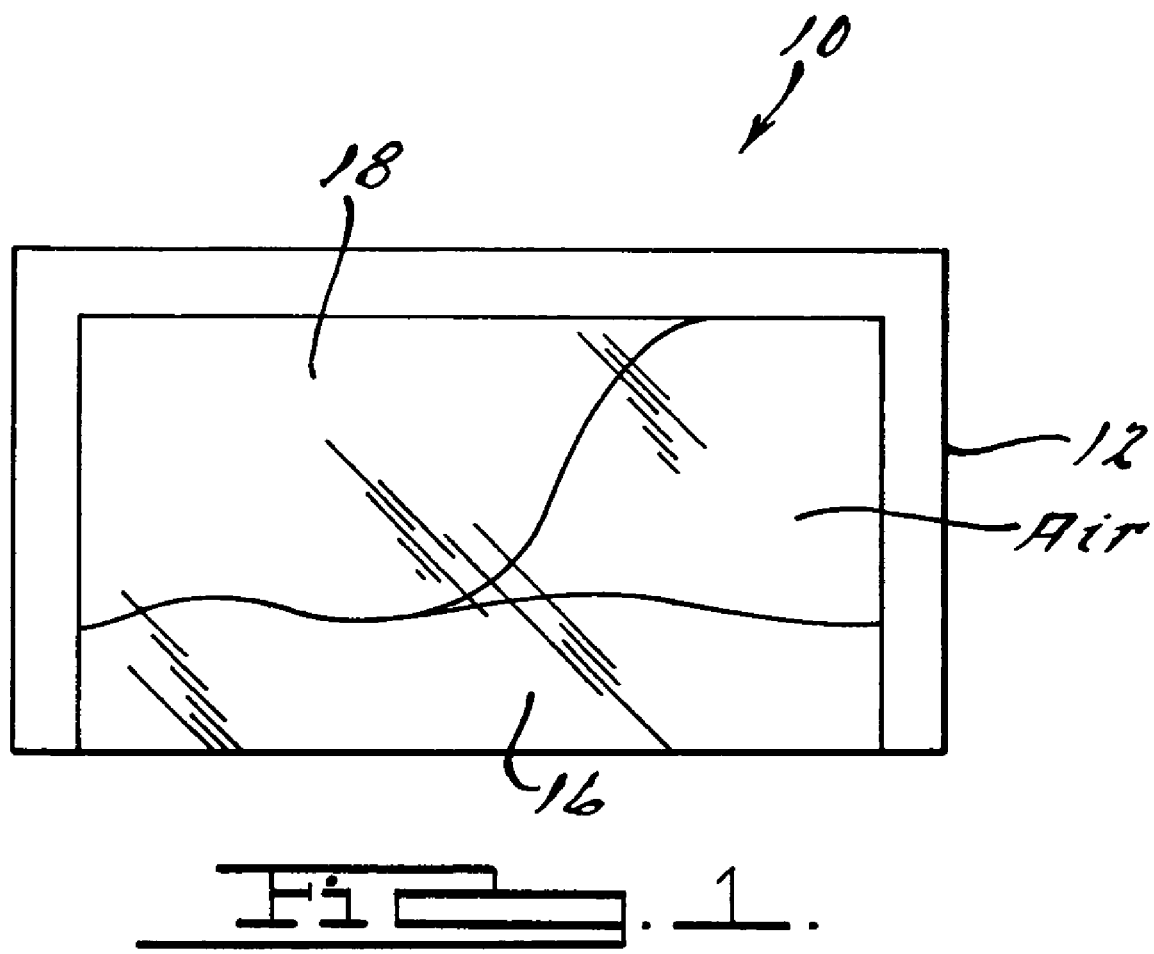

ADHESIVE SYSTEM AND METHOD OF MAKING SAME

BACKGROUND OF THE INVENTION

1. Field of the Invention

The present invention relates generally to adhesives and, more particularly, to an adhesive system and a method of making the adhesive system.

2. Description of the Related Art

It is known to use adhesives for joining parts, for sealing purposes, and for other purposes. Some adhesives, such as epoxy adhesives, typically include a separate resin and a separate hardener that remain fluid until the resin and hardener are mixed together and chemically reacted together. The resin and hardener are mixed in predetermined proportions and, after a relatively short period of time, the resin hardens or cures. Preferably, the mixture is applied where needed before curing occurs.

However, preparing and using an epoxy adhesive can be challenging. For instance, there may be too much resin in proportion to the hardener or vice versa to properly cure the epoxy adhesive. Also, the epoxy adhesive may cure before the user is able to properly apply the adhesive. Further, preparing an epoxy adhesive can be messy and inconvenient. For instance, if the components are mixed in a container with a mixing tool, both the container and mixing tool should be cleaned before the epoxy adhesive cures or else the cured epoxy adhesive will be extremely difficult to remove. Also, too much epoxy adhesive might be prepared, and the excess epoxy adhesive will be wasted.

In partial response to these disadvantages, epoxy adhesive systems were developed in which uncured resin and hardener were encapsulated within a package. Two examples of these epoxy adhesive systems are disclosed in U.S. Pat. Nos. 4,686,272 and 4,764,579. In these systems, small, discrete deposits of uncured resin are interspersed within a hardener, and the deposits are separated from the hardener by a thin, flexible, collapsible barrier film. To use the epoxy adhesive, a user presses and "kneads" the package to collapse the barrier film, thereby allowing the resin to mix with the hardener and cure. However, the barrier film may be fragile and may inadvertently collapse when the package is handled or when the package is exposed to elevated temperatures.

Therefore, it is desirable to provide an improved package of adhesive components that can be mixed and chemically reacted together to form an adhesive within the package. It is also desirable to provide an improved package of adhesive components that are less likely to inadvertently combine and cure. Thus, there is a need in the art to provide an adhesive system that meets these desires.

SUMMARY OF THE INVENTION

It is, therefore, one object of the present invention to provide an adhesive system having an improved package of components adapted to chemically react with each other when desired to form an adhesive.

It is another object of the present invention to provide an adhesive system having a package of components in which the components are less likely to inadvertently combine and cure.

It is yet another object of the present invention to provide an adhesive system having a package of components that can be mixed and chemically reacted with each other when desired for convenience and with less mess.

To achieve at least one of the foregoing objects, the present invention is an adhesive system. The adhesive system includes a package that defines a chamber, a resin component disposed within the chamber, and a hardener component disposed within the chamber. At least one of the resin component and the hardener component contains a photo-curable ingredient and is through cured to thereby prevent chemical reaction of the resin component with the hardener component within the package.

Additionally, the present invention is a method of making an adhesive system. The method includes the steps of providing a package that defines a chamber and disposing a resin component and a hardener component into the chamber with at least one of the resin component and the hardener component containing a photo-curable ingredient. The method also includes the step of through curing either the resin component or the hardener component containing the photo-curable ingredient to thereby prevent chemical reaction of the resin component and the hardener component in the package.

One advantage of the present invention is that a new adhesive system is provided to allow chemical mixing of a resin and hardener with each other in a package when desired prior to dispensing. Another advantage of the present invention is that the adhesive system has adhesive components that are less likely to inadvertently combine and cure. Yet another advantage of the present invention is that the adhesive system has adhesive components within the package and can be premeasured such that the components are included in the proper proportions to produce the adhesive. Still another advantage of the present invention is that the adhesive system contains an amount of adhesive in a package that can be relatively small to complete individual jobs with less wasted adhesive. A further advantage of the present invention is that the adhesive system can produce an adhesive that is applied quickly and neatly.

Other objects, features, and advantages of the present invention will be readily appreciated, as the same becomes better understood, after reading the subsequent description taken in conjunction with the accompanying drawing.

BRIEF DESCRIPTION OF THE DRAWINGS

FIG. 1 is an elevational view of an adhesive system, according to the present invention.

DESCRIPTION OF THE PREFERRED EMBODIMENT(S)

Referring to the drawing and in particular FIG. 1, one embodiment of an adhesive system 10, according to the present invention, is shown to produce an adhesive. The adhesive system 10 includes a package 12 that defines a chamber 14. The adhesive system 10 also includes a plurality of components, preferably a resin component 16 and a hardener component 18 that are each disposed and contained within the chamber 14. The resin component 16 and hardener component 18 are adapted to chemically react with each other when mixed to produce an epoxy adhesive. It should be appreciated that, however, the adhesive system 10 could include many types of components to produce several types of adhesives. It should also be appreciated that the resin component 16 and hardener component 18 do not inadvertently mix inside the chamber 14 until a user so desires by pressing or "kneading" the package 12, thereby mixing the resin component 16 and hardener component 18 in the chamber 14 to cause a chemical reaction between the resin component 16 and hardener component 18 and to begin curing the epoxy adhesive just prior to dispensing.

The adhesive system 10 includes a package 12. In one embodiment, the package 12 is made of a flexible material, such as a plastic film to allow a user to mix the resin component 16 and hardener component 18 while contained inside the package 12. Also, the package 12 is transparent to allow the user to see the resin component 16 and hardener component 18. In other embodiments, different pigments could be added to the resin component 16 and hardener component 18 so that the resulting color will reveal a complete and proper mixing. In one embodiment, the package 12 can be easily opened, for instance by cutting, to apply the adhesive.

The adhesive system 10 also includes a photo-curable ingredient contained in at least one of the resin component 16 and the hardener component 18. In one embodiment, the resin component 16 includes the photo-curable ingredient, and the photo-curable ingredient allows the resin component 16 to be through cured to a gel state. It should be appreciated that the photo-curable ingredient allows the component to be through cured to thereby prevent reaction between the resin component 16 and the hardener component 18. It should be appreciated that the lattice matrix of the gel is a physical barrier to prevent penetration of the other component.

In order to package the resin and hardener components 16 and 18, respectively, the package 12 is provided, and then the resin component 16 and hardener component 18 are introduced into the chamber 14. In one embodiment, the resin component 16 includes the photo-curable ingredient, and the resin component 16 is introduced into the chamber 14 first. Then, the resin component 16 is exposed to UV light so as to through cure the resin component 16. In one embodiment, the resin component 16 is exposed to UV light having a wavelength of approximately 200 nanometers to approximately 400 nanometers for approximately one and a half seconds to approximately three seconds. Next, the hardener component 18 is introduced into the chamber 14. Chemical reaction between the resin and hardener components 16, 18 is thereby prevented when the hardener component 18 is introduced.

When a user wants to produce an epoxy adhesive for joining or sealing parts, the user selectively presses and kneads the outside of the package 12, which mixes and causes chemical reaction to begin between the resin component 16 and hardener component 18 to form the epoxy adhesive. In one embodiment, the package 12 is pressed and "kneaded" for approximately 15 seconds, then set aside for approximately 30 seconds, and then further pressed and "kneaded" for approximately 10 seconds to start the chemical reaction between the resin component 16 and hardener component 18. Then, the user opens the package 12 and applies the epoxy adhesive to any desired location where the curing process continues until complete.

Accordingly, the adhesive system 10 is convenient because it contains pre-measured amounts of resin and hardener components 16 and 18, respectively, such that the components can be included in the necessary proportions to produce the adhesive. The adhesive system 10 can also be sized so as to produce an amount of epoxy adhesive appropriate for a single-use application such that there is less waste. Furthermore, the adhesive system 10 can produce an adhesive that can be applied quickly and neatly. Additionally, the adhesive system 10 prevents the resin component 16 and hardener component 18 from inadvertently mixing and curing, even when exposed to elevated temperatures.

In the adhesive system 10, the resin component 16 may be of any suitable type. In one embodiment, the resin component 16 includes a BisPhenol-A epoxy resin and at least one ingredient selected from a group consisting of monofunctional acrylic, bifunctional acrylic, trifunctional acrylic, multifunctional acrylic, methacrylic resin, and mixtures thereof. In one embodiment, the resin component 16 is bisphenol-A-(epihlorhydrin) or Bis A epoxy resin.

In the adhesive system 10, the resin component 16 includes a photo-curable ingredient that may be of any suitable type, such as an acrylic monomer, preferably a trifunctional acrylate monomer along with a photo-initiator for free radical polymerization, such as 2 Hydroxy-2-Methylpropiophenone ($C_6H_5COC(CH_3)_2OH$). In one embodiment, the resin component 16 contains approximately two percent by weight to approximately five percent by weight (2 wt. % to 5 wt. %) of photo-curable ingredient.

In one embodiment, at least one, and preferably both, of the resin component 16 and the hardener component 18 includes a defoamer. The deformer is a one hundred percent (100%) active silicone fluid containing a suspension of finely powdered silica to enhance its defoaming efficiency or a food grade antifoam. It should be appreciated that the term "defoamer" as used herein is meant to encompass all substances intended to limit foam. It should also be appreciated that the defoamer could be used to control foam that already exists above the surface of the liquid and/or to prevent or minimize foam formation.

The resin component 16 may include an epoxy functional silane to provide durability, gloss, adhesion promotion and cross linking.

In the adhesive system 10, the hardener component 18 may be of any suitable type. In one embodiment, the hardener component 18 contains at least one of an amine hardener and a mercaptan hardener.

In one embodiment, the resin component 16 includes between approximately 90 wt. % and 98 wt. % epoxy resin, such as Epon 828, which is commercially available from the Dow Chemical Company or Resolution. The resin component 16 also includes between approximately 2 wt. % and 5 wt. % of the photo-curable ingredient or UV resin, such as TMPTA, which is commercially available from Rahn or Sartomer. The resin component 16 further includes between approximately 0.1 wt. % and 0.5 wt. % photo-initiator, such as Darocur 1173, which is commercially available from Ciba S C, Rahn, or Sartomer. In addition, the resin component 16 includes between approximately 0.0 wt. % and 0.5 wt. % defoamer, such as Antifoam A, which is commercially available from Air Products, Dow Chemical, or BYK. Also, the resin component 16 includes between approximately 0.1 wt. % and 1.5 wt. % of an adhesion promoter, such as Silane A-187, which is commercially available from General Electric, OSI, or Gelest.

Furthermore, in one embodiment, the hardener component 18 includes between approximately 40 wt. % and 60 wt. % of a first amine hardener, which is a mercapton-based epoxy hardener, such as Capcure 40sechv, which is commercially available from Cognis, Air Products, or Resolution. Also, the hardener component 18 includes between approximately 35 wt. % and 55 wt. % of a second amine hardener, which is an Aliphatic amine, such as Ancamine 1767, which is commercially available from Cognis, Air Products, or Resolution. Further, the hardener component 18 includes between approximately 1 wt. % and 5 wt. % of a third amine hardener, which is an Aliphatic amine, such as Ancamine 1608, which is commercially available from Cognis, Air Products, or Resolution. In addition, the hardener component 18 includes between approximately 0.0 wt. % and 0.5 wt. % of a defoamer, such as Antifoam A previously described. Also, the hardener component 18 may include between approximately 0.05 wt. % and 0.15 wt. % of a colorant, such as Chromatherm Lamp Black. Furthermore, the hardener component 18 includes between approximately 0.0 wt. % and 1.0 wt. % of thickener, which is a dimethyl silicone fluid treated fumed silica hydrophobic thixotrope for resins, such as Cab-o-sil TS 720, which is commercially available from Cabot or Degussa. It should be appreciated that the colorant is optional.

The preparation of the adhesive system 10 containing the resin and hardener components 16 and 18 in the package 12, in accordance to the teachings of the present invention, is presented in Example I below:

EXAMPLE I

The resin component 16 was prepared containing approximately 95.2 wt. % Epon 828 epoxy resin, 4.0 wt. % TMPTA UV resin, 0.2 wt. % Daracur 1173 photo-initiator, 0.1 wt. % Antifoam A defoamer, and 0.5 wt. % Silane A-187 adhesion promoter.

The hardener component 18 was prepared containing approximately 50.1 wt. % Capcure 40sechv amine hardener, 46.2 wt. % Ancamine 1767 amine hardener, 3.0 wt. % Ancamine 1608 amine hardener, 0.1 wt. % Antifoam A defoamer, optionally 0.1 wt. % Chromatherm Lamp Black colorant, and 0.5 wt. % Cab-o-sil TS-720 thickener.

The mix ratio by weight of the resin to hardener was 100 to 63.5. Also, the specific gravity of the resin was 1.15 and the specific gravity of the hardener was 1.05.

The resin component 16 was introduced into the chamber 14 of the package 12 first. Then, the resin component 16 was exposed to UV light so as to through cure the resin component 16. The resin component 16 was exposed to UV light having a wavelength of approximately 200 nanometers to approximately 400 nanometers for approximately one and a half seconds. Next, the hardener component 18 was introduced into the chamber 14 of the package 12. Chemical reaction between the resin and hardener components 16, 18 was prevented when the hardener component 18 was introduced. The package 12 was then sealed and stored for later use by a user. It should be appreciated that numerous packages 12 were sealed and stored for later use by a user.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. An adhesive system comprising:
   a package that defines a chamber;
   a resin component disposed within said chamber;
   a hardener component disposed within said chamber; and
   wherein at least one of said resin component and said hardener component includes a photo-curable ingredient and is through cured to thereby prevent chemical reaction between said resin component and said hardener component within said package.

2. An adhesive system as set forth in claim 1 wherein said hardener component and said resin component are selectively mixed in said chamber to cause reaction between said resin component and said hardener component.

3. An adhesive system as set forth in claim 1 wherein at least one of said resin component and said hardener component that contains the photo-curable ingredient is cured to a gel state.

4. An adhesive system as set forth in claim 1 wherein said photo-curable ingredient is an acrylic monomer along with a photo-initiator.

5. An adhesive system as set forth in claim 1 wherein said resin component contains a BisPhenolA epoxy resin and at least one ingredient selected from a group consisting of monofunctional acrylic, difunctional acrylic, trifunctional acrylic, multifunctional acrylic, methacrylic resin, and mixtures thereof along with a suitable initiator.

6. An adhesive system as set forth in claim 1 wherein at least one of said resin component and said hardener component includes a defoamer.

7. An adhesive system as set forth in claim 1 wherein said resin component includes a silane-containing material.

8. An adhesive system as set forth in claim 1 wherein at least one of said resin component and said hardener component may include at least one colorant.

9. An adhesive system as set forth in claim 1 wherein said at least one of said resin component and said hardener component contains approximately two weight percent to approximately five weight percent (2 wt. % to 5 wt. %) of the photo-curable ingredient.

10. An adhesive system as set forth in claim 9 wherein said at least one of said resin component and said hardener component contains approximately four weight percent (4 wt. %) of photo-curable ingredient.

11. An adhesive system as set forth in claim 1 wherein said hardener component contains at least one of an amine hardener and a mercaptan hardener.

12. A method of making an adhesive system, said method comprising the steps of:
   providing a package that defines a chamber;
   disposing a resin component and a hardener component into the chamber, wherein at least one of the resin component and the hardener component includes a photo-curable ingredient; and
   through curing either the resin component or the hardener component containing the photo-curable ingredient to thereby prevent chemical reaction between the resin component and the hardener component.

13. A method as set forth in claim 12 wherein said step of disposing the resin component and the hardener component into the chamber comprises introducing one of the resin component and the hardener component containing the photo-curable ingredient into the chamber, exposing the one of the resin component and the hardener component to UV light, and introducing the other of the resin component and the hardener component into the chamber.

14. A method as set forth in claim 13 wherein said step of exposing the one of the resin component and the hardener component containing the photo-curable ingredient to UV light comprises exposing the one of the resin component and the hardener component containing the photo-curable ingredient to UV light having a wavelength of approximately 200 nanometers to approximately 400 nanometers for approximately one and half seconds to approximately three seconds.

15. A method as set forth in claim 12 wherein the photo-curable ingredient is an acrylic monomer along with a photo-initiator.

16. A method as set forth in claim 12 wherein the resin component includes a BisPhenolA epoxy resin and at least one ingredient selected from a group consisting of monofunctional acrylic, difunctional acrylic, trifunctional acrylic, multifunctional acrylic, methacrylic resin, and mixtures thereof along with a suitable initiator.

17. A method as set forth in claim 12 wherein the at least one of the resin component and the hardener component contains approximately two weight percent to approximately five weight percent (2 wt. % to 5 wt. %) of the photo-curable ingredient.

18. A method as set forth in claim 12 wherein the at least one of the resin component and the hardener component contains approximately four weight percent (4 wt. %) of the photo-curable ingredient.

19. A method as set forth in claim 12 wherein the hardener component contains at least one of an amine hardener and a mercaptan hardener.

20. An adhesive system comprising:
a package that defines a chamber;
a resin component disposed within said chamber;
a hardener component disposed within said chamber;
wherein said resin component includes an acrylic monomer and photo-initiator and is through cured to thereby prevent chemical reaction between said resin component and said hardener component within said package; and
wherein said hardener component and said resin component can be selectively mixed in said chamber to cause chemical reaction between said resin component and said hardener component.

* * * * *